United States Patent
Irvin et al.

(12)

(10) Patent No.: US 6,381,713 B1
(45) Date of Patent: Apr. 30, 2002

(54) METHOD FOR RESPONDING TO TRANSMISSION ERRORS IN A DIGITAL COMMUNICATION SYSTEM ACCORDING TO CHARACTERISTICS OF FLAWED INFORMATION FIELDS

(75) Inventors: David Rand Irvin, Raleigh; Ali S. Khayrallah, Apex, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/309,352

(22) Filed: May 11, 1999

(51) Int. Cl.$^7$ .................. G06F 11/00; H03M 13/00
(52) U.S. Cl. ............... 714/701; 714/761; 714/776; 370/314
(58) Field of Search ................. 714/758, 761, 714/701, 785, 776; 370/314

(56) References Cited

U.S. PATENT DOCUMENTS 5,608,739 A * 3/1997 Snodgrass et al. .......... 714/785
5,867,510 A * 2/1999 Steele ........................ 714/758

FOREIGN PATENT DOCUMENTS

EP 0634840 A1 1/1995 .......... H03M/13/00
GB 2328125 A 2/1999 ............. H04L/1/00

OTHER PUBLICATIONS

Lin, Shu. *An Introduction to Error-Correcting Codes.* Section 5.2. Prentice-Hall, 1970.
Berlekamp, Elwyn. *Algebraic Coding Theory.* Chapter 5. McGraw-Hill, 1968.

Copy of PCT Search Report in corresponding PCT Application PCT/US00/11784.

* cited by examiner

*Primary Examiner*—Emmanuel L. Moise
(74) *Attorney, Agent, or Firm*—Myers Bigel Sibley & Sajovec (57) ABSTRACT

In a digital communication system, a method is provided for recognizing and acting upon differences in information field characteristics when transmission errors are detected. Information having more than one field protected by a channel code is received and decoded according to the channel code. Based on the outcome of the decoding, fields of the information into which transmission errors fall are identified. These are called flawed fields. A characteristic of a flawed field is determined. The information is then processed according to the characteristic. In one embodiment of the invention, the syndrome of an incoming packet is computed. When the syndrome is all-zero, the packet is passed up a communication protocol stack conventionally. When the syndrome is not all-zero, the coset leader associated with the syndrome is found, and used to determine which fields of the packet are most likely flawed. Based on this determination, the packet is then rejected, corrected, or accepted without correction, according to the following method: When a critical field of the packet header is flawed, the packet is rejected. Otherwise, the packet is passed up the protocol stack with its transmission errors corrected or uncorrected, depending on the importance of the fields into which transmission errors fall.

27 Claims, 7 Drawing Sheets

METHOD FOR RESPONDING TO TRANSMISSION ERRORS IN A DIGITAL COMMUNICATION SYSTEM ACCORDING TO CHARACTERISTICS OF FLAWED INFORMATION FIELDS

BACKGROUND OF THE INVENTION

1. Field of the Invention

The present invention relates generally to digital communication systems, and more particularly to a method that recognizes differences in characteristics among the information fields of digital. information that is protected by a channel code, and acts in recognition of these differences when transmission errors are found.

2. Description of the Related Art

In a digital communication system, digital information such as voice, data, image, or video, for example, passes from one location to another over a communication channel in the form of packets or frames of symbols such as binary digits (bits). When the communication channel is subject to a disturbance such as electrical noise, one or more bits crossing the channel may be altered, so that the information arriving at the far end of the channel is not received exactly as intended. Bits so altered are said to have been subject to transmission error, and the packet or portions thereof into which transmission errors fall are said to be flawed.

Errors are introduced by communication channels to a greater or lesser degree, dependent upon the physical makeup of the channels. At one extreme, a fiber-optic channel that is operating properly introduces transmission errors only rarely, because a fiber-optic channel is essentially invulnerable to the influence of its surroundings. At the other extreme, a radio link, even when designed properly and operating correctly, is highly subject to transmission errors caused by signal fading, atmospheric disturbances, intervening obstacles, limitations of radiated signal strength, interference caused by other radio activities, and a myriad of related phenomena.

To guard against transmission errors in a digital communication system, channel codes are used. These codes generate parity bits, a form of redundancy, that are included within the packet. In view of the added redundancy, a receiver can detect the presence of transmission errors with some degree of certainty, and often correct these errors.

However, the capability of a channel code to detect or correct transmission errors comes at a price: the parity bits require additional transmission bandwidth or impose longer transmission times, and therefore cause economic inefficiency. Further, the apparatus required to encode and decode is complex. In the world of miniature wireless communication terminals with extensive data communication features, the burden of the channel coding and decoding apparatus ultimately becomes onerous in proportion to its expense and in proportion to its need for space, heat dissipation, and battery power. So, despite the pressing need for channel coding in wireless systems, which are inevitably prone to transmission error, unlimited channel coding cannot be employed—rather, a practical balance must be struck between the capability of the channel code and the constraints on bandwidth, economics, and terminal size.

Further complicating the question of balance, transmission errors that fall into the header of a packet are often more troublesome than transmission errors that fall into the payload of a packet, because the header often carries information that is crucial to delivering the packet to the proper destination. In response to the need to distinguish between header errors and payload errors, the related art teaches the use of a first set of parity bits to protect the header and a second set of parity bits to protect the payload. Typically, the first parity bits come from a cyclic redundancy check (CRC) that is computed according to a relatively low-order generating polynomial, and the second parity bits come from a CRC computed according to a relatively high-order generating polynomial. For example, a four-bit CRC field may be included as the last field of the header, and a sixteen-bit CRC field may be included as the last field of the payload.

However, the above error control method is inherently inefficient. On the one hand, the redundancy bits devoted to protecting the header consume valuable transmission time or bandwidth, and the number of redundancy bits must therefore be limited. On the other hand, a limited number of redundancy bits have only a limited capability to protect crucial information carried by the header. Further, the receiver needs two separate CRC decoders, one for the header check and one for the payload check. The need for two separate decoders introduces unwanted complexity. Finally, the above error control method does not adapt to changes in the characteristics of the flawed information, as each of the two separate CRC decoders acts separately and blindly upon the bits under its protection. This method taught by the related art is therefore inflexible. For instance, the method requires a plurality of different packet structures to accommodate a spectrum of multimedia applications wherein the location of the crucial information within a packet does not necessarily follow the simple header-payload dichotomy, but rather changes from application to application and packet to packet.

Alternately, the related art teaches the use of complex channel codes that attempt to provide unequal protection of the bits within the confines of a single packet. Unfortunately, these codes have a number of shortcomings that limit their practical usefulness. In some instances, such codes may provide little difference between the maximum and minimum degree of protection of the bits under their protection. In other instances, such codes suffer greatly degraded performance when stretched to differentiate significantly between maximum and minimum. Moreover, were such a code required to adapt to the ever-changing demands of a multimedia system, wherein the location of crucial information within the packet may change from a first application to a second application, and from a first packet to a second packet even for a first application, the resulting encoder and decoder would be prohibitively complex, and therefore expensive, undesirable, and prone to consume excessive battery power when used in a portable device such as, for example, a miniature wireless communication terminal.

In view of these and other limitations of the related art, a need exists for a method of determining which subsets of digital information are flawed by transmission error and acting in recognition of differences in the natures of these subsets, where the method is: a) suitably flexible to meet the demands of multimedia traffic; b) strong when needed in its capability to protect against transmission errors; and c) efficient in. its use of battery power, transmission bandwidth, and processing resources so that it may be practically applied to wireless communications.

BRIEF SUMMARY OF THE INVENTION

It is therefore an object of the present invention to provide a method of responding to transmission errors in information that flows across a digital communication system, wherein the method determines which subsets of the information are flawed, and acts in recognition of differences in the characteristics of these subsets.

It is therefore another object of the present invention to provide a method of processing digital information, wherein the method responds to the occurrence of transmission errors in a digital communication system, and the method is suitably flexible to meet the demands of multimedia traffic in which the location of crucial information within a packet may change from a first application to a second application and a first packet to a second packet.

It is yet another object of the present invention to provide an improved method of responding to transmission errors in a digital communication system, where the improved method is efficient in its use of electrical power, transmission bandwidth, and processing resources so that the improved method may be practically applied to wireless communications.

In a preferred embodiment of the invention, an incoming packet is decoded by computing the syndrome of the packet according to a channel code and examining the computed syndrome. When the syndrome is all-zero, the packet is passed up a communication protocol stack conventionally. When the syndrome is not all-zero, the decoding operation is continued by finding a coset leader associated with the syndrome. The coset leader is used to determine which fields of the packet are most likely flawed. Based on this determination, the packet is then rejected, corrected, or accepted without correction, according to the following method. When a field of critical importance is flawed, the packet is rejected. When the critical fields of the packet are intact but one or more of its fields of correctable importance are flawed, transmission errors in the correctable fields of the packet are corrected, and the packet is passed up the protocol stack. Otherwise, the packet is passed up the protocol stack uncorrected, as the critical and correctable fields of the packet are intact, but at least one field of tolerant importance is flawed.

In a preferred embodiment of the present invention, information is of critical importance (or "critical") when it is inflexibly intolerant of error. Information is of correctable importance (or "correctable") when it is tolerant enough of error to withstand the presence of an occasional error that survives the correction attempt of an error-correcting decoder. Information is of tolerant importance (or "tolerant") if it may be readily used even though it contains a substantial number of transmission errors. Typically, one or more of the header fields of a packet are critical. Typically, the payload field of the packet is: a) critical when carrying data that is inflexibly intolerant of any risk of error such as, for example, financial data or key system-managment instructions, b) correctable when carrying, for example, image or data information for static display on a screen, and c) tolerant when carrying, for example, voice or video information for real-time playback. Typically, the parity field of the packet is correctable.

In accordance with a preferred embodiment, a method is provided for responding to transmission errors in digital information that is protected by a channel code and that is segmented into a plurality of fields such as a header field, a payload field, and a parity field, wherein the method comprises the steps of: decoding the digital information according to the channel code; identifying, responsive to the step of decoding, a flawed field of the plurality of fields; determining a characteristic of the flawed field; and processing the digital information according to the characteristic.

A preferred embodiment of the present invention addresses shortcomings of current methods for processing information in a mixed-media or a multimedia system, wherein some applications are more tolerant of transmission errors than others, and, even within a given packet, some transmission errors are more troublesome than others. This question of the relative importance of information flawed by transmission errors arises, for example, when a communication. system carries a mix of traffic that varies from key financial information such as credit card numbers, to ordinary alphanumeric text or image for display on a screen, to digitally encoded speech or video signals. Each of these applications demands a different approach to dealing with transmission errors.

When critical information is thought to be flawed, it should not be corrected; rather, it should be rejected in favor of the retransmission of new information, so as to minimize the risk of catastrophe. Under different circumstances, for example when text for ordinary screen display is thought to be flawed, transmission errors may be corrected by a channel code without undue risk, even though the would-be correction may itself be incorrect on rare occasion. Under yet different circumstances, for example when a packet carrying digitally encoded speech or video is flawed, its proper disposition depends on which fields of the packet have been affected. When transmission errors fall within the payload of the packet, the payload may sometimes be used without correction, as the presence of transmission errors in the payload may have little consequence beyond a passing degradation of fidelity. When, on the other hand, transmission errors fall within the header of the packet, the flawed packet might best be discarded, as the header often carries information that is crucial to delivering the packet to the proper destination. Alternately, the error might acceptably be corrected, depending on the nature of the specific field of the header that is flawed.

An advantage of the present invention is the capability to process information in a way that depends on the characteristics of a subset of the information, where that subset is flawed by transmission error.

Another advantage of the present invention is the adaptability to process information from a multimedia system effectively and economically when the information is flawed by transmission error.

Yet another advantage of the present invention is efficiency in the use of battery power, transmission bandwidth, and processing resources, so that the invention may be practically applied to wireless communications subject to frequent transmission error.

BRIEF DESCRIPTION OF THE SEVERAL VIEWS OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
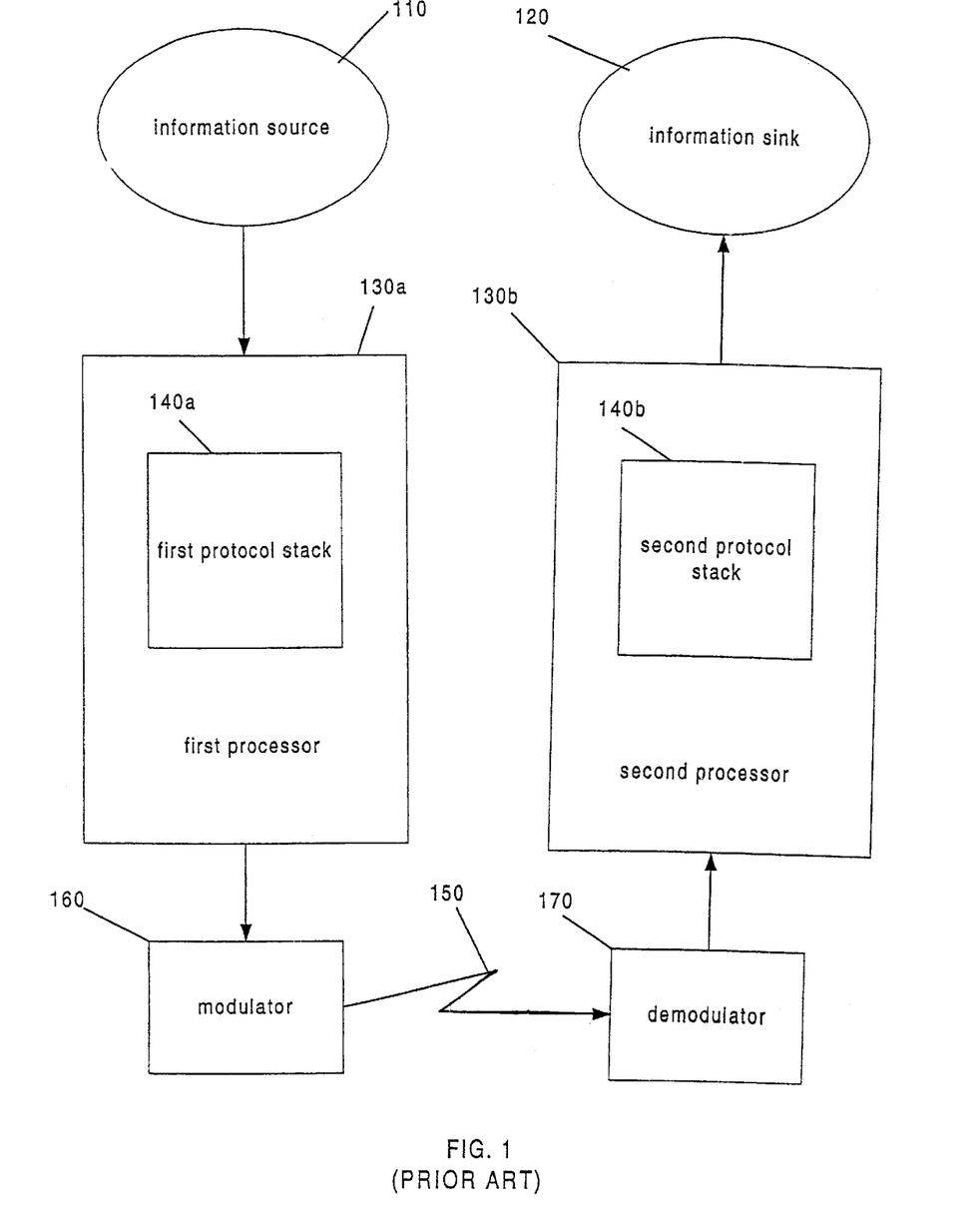
FIG. 1 is a block diagram showing a prior art digital communication system in generic form.

As an aid to the description of the present invention, FIG. 1 shows an exemplary digital communication system according to the prior art. An information source 110 generates information to be sent to an information sink 120. The information source 110 passes the information to a first processor 130a or other logic or circuitry, which adapts the information according to software organized as a first communication protocol stack 140a for transmission across a communication channel 150 by way of a transmitter or modulator 160. On the other end of the communication channel 150, a receiver or demodulator 170 accepts the incoming information and passes it to a second processor 130b or other logic or circuitry, which adapts the information according to software organized as a second communication protocol stack 140b for presentation to the communication sink 120.

Figure 2:
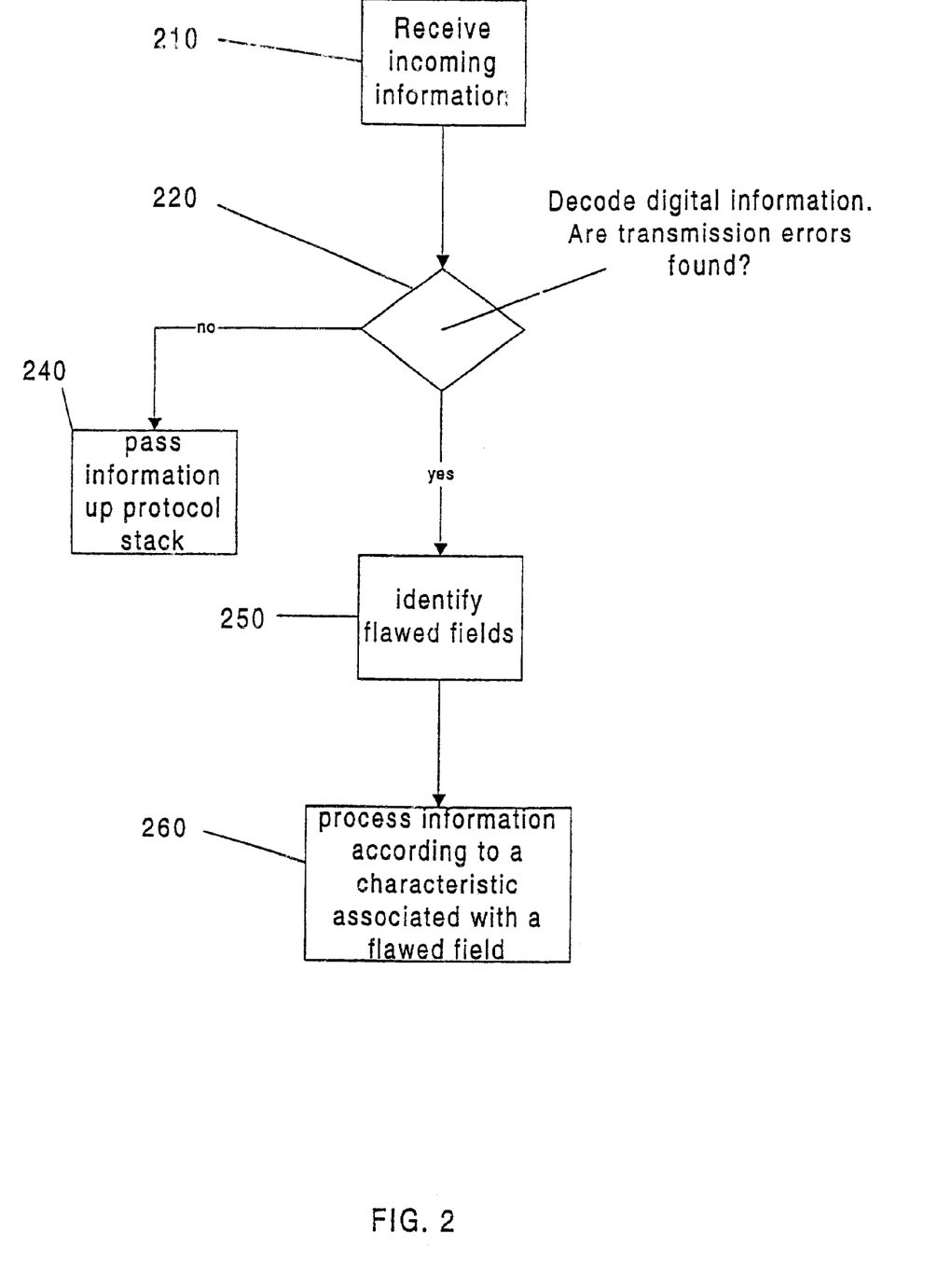
FIG. 2 is a flowchart showing the logical operation of a preferred method that determines which fields of incoming information are flawed by transmission errors, and processes the information by taking measures associated with a characteristic of at least one flawed field.

FIG. 2 is a flowchart showing a preferred method of the logical operation of the second processor 130b when the incoming digital information is flawed by transmission errors. In a block 210, incoming information is received. The received information is checked for the presence of transmission error in a block 220. When the information is found to be without transmission error, the information is passed up the second protocol stack 140b in a conventional manner in a block 240. When transmission errors are found, the fields of the information that are flawed are identified in a block 250 according to methods described subsequently, and the information is processed according to a characteristic associated with a flawed field in a block 260. According to the present invention, the act of processing information encompasses, but is not limited to, the invoking of various error-control and error-recovery methods suited to the nature of the flawed information subset and the transmission channel, the routing of flawed information to alternate destinations, the charging or billing of users according to the nature and occurrence of the flaws, and so forth.

Figure 3:
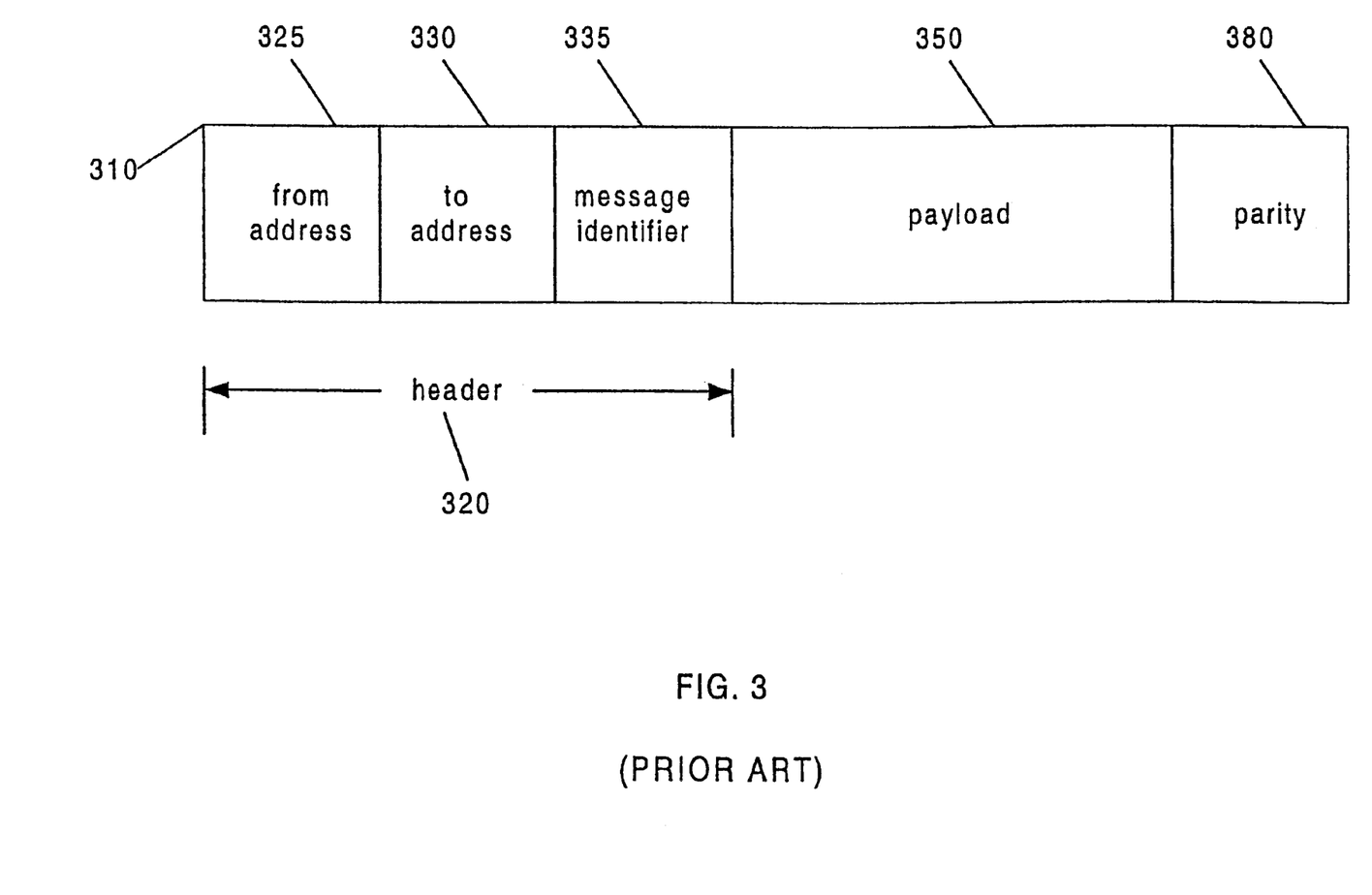
FIG. 3 shows a structure according to the prior art of a packet suitable for transmission across a digital communication system of the kind shown in FIG. 1.

FIG. 3 describes an exemplary organization of the information passed across the communication channel 150, according to the prior art. For purposes of illustration, the information is shown as a packet 310 of bits appropriate to the layer-2-to-layer-2 operation of the protocol stacks 140a, 140b (see FIG. 1). In a practical system, the packet 310 may have additional headers and trailers responsive to the needs of the information source 110 and sink 120 (i.e., responsive to the needs of the application using the digital communication system) and responsive to the needs of higher layers of the protocol stacks 140a, 140b. These additional headers and trailers have been omitted from FIG. 3 in the interest of clarity.

The packet 310 shown in FIG. 3 comprises a three-field header 320, a payload field 350, and a parity field 380. The header 320 has a from-address field 325 that identifies the information source 110, a to-address field 330 that identifies the information sink 120, and a message identifier field 335 that conveys the nature of the application or the identity of the session that the information source 110 and information sink 120 are engaged in. The message identifier field 335 may consequently serve to identify the nature and identity of the information carried by the payload field 350, as well as the information session and user having ownership of the packet 310. Bits of the parity field 380 are computed according to a channel code capable of error correction or error detection. For example, bits of the parity field 380 may be computed according to a binary Hamming code as described hereinbelow, and as further described by Shu Lin in Section 5.2 of *An Introduction to Error-Correcting Codes*, Prentice-Hall, 1970, and by Elwyn Berlekamp in Chapter 5 of *Algebraic Coding Theory*, McGraw-Hill, 1968, which are hereby incorporated by reference herein.

In a preferred embodiment of the present invention, the fields of the packet 310 are each associated with one or more characteristics. A list, catalog, or database of these associations and ancillary information is held within, or made available to, the second processor 130b or its delegate. Such characteristics may include, but are not limited to, the importance of the information carried by the field; the location of the field within the information; the nature or session identity of the application using the field; the time of day or day of week when the field is sent or received; the geographic location from which the field is sent or received; the identity of the party sending or receiving the information carried by the field; tariff, quality-of-service, and grade-of-service considerations; and so forth.

For clarity of explanation rather than purpose of limitation, the discussion here concerns mainly the characteristic of the importance of the information carried in the field. Apropos to this characteristic, the importance of information is deemed critical, correctable, or tolerant. Information is critical when it is inflexibly intolerant of error. Information is correctable when it is tolerant enough of error to withstand the presence of an occasional error that survives the correction attempt of an error-correcting decoder. Information is tolerant when it may be passed to the information sink 120 and readily used without correction even though it contains a substantial number of transmission errors. Alternately, information is tolerant when the result of an attempted correction of transmission errors may be passed to the information sink even though the number of transmission errors purportedly corrected is thought to exceed the correction capacity of the error correcting channel code. Typically, one or more of the header fields 325, 330, and 335 of the packet 310 is critical. The payload field 350 is critical when carrying data that is inflexibly intolerant of any risk of error such as financial data or key system-managment instructions, the payload field 350 is correctable when carrying image or data information for static display on a screen, and the payload field 350 is tolerant when carrying voice or video information for real-time playback. The parity field 380 is typically correctable.

The present invention makes a distinction among transmission errors according to the characteristic associated with the fields that they fall into. In a preferred embodiment described below, using methods described below, a distinction is made among errors that are thought to fall into the critical fields, the correctable fields, and the tolerant fields of incoming information, and the information is processed in recognition of the distinction.

Figure 4:
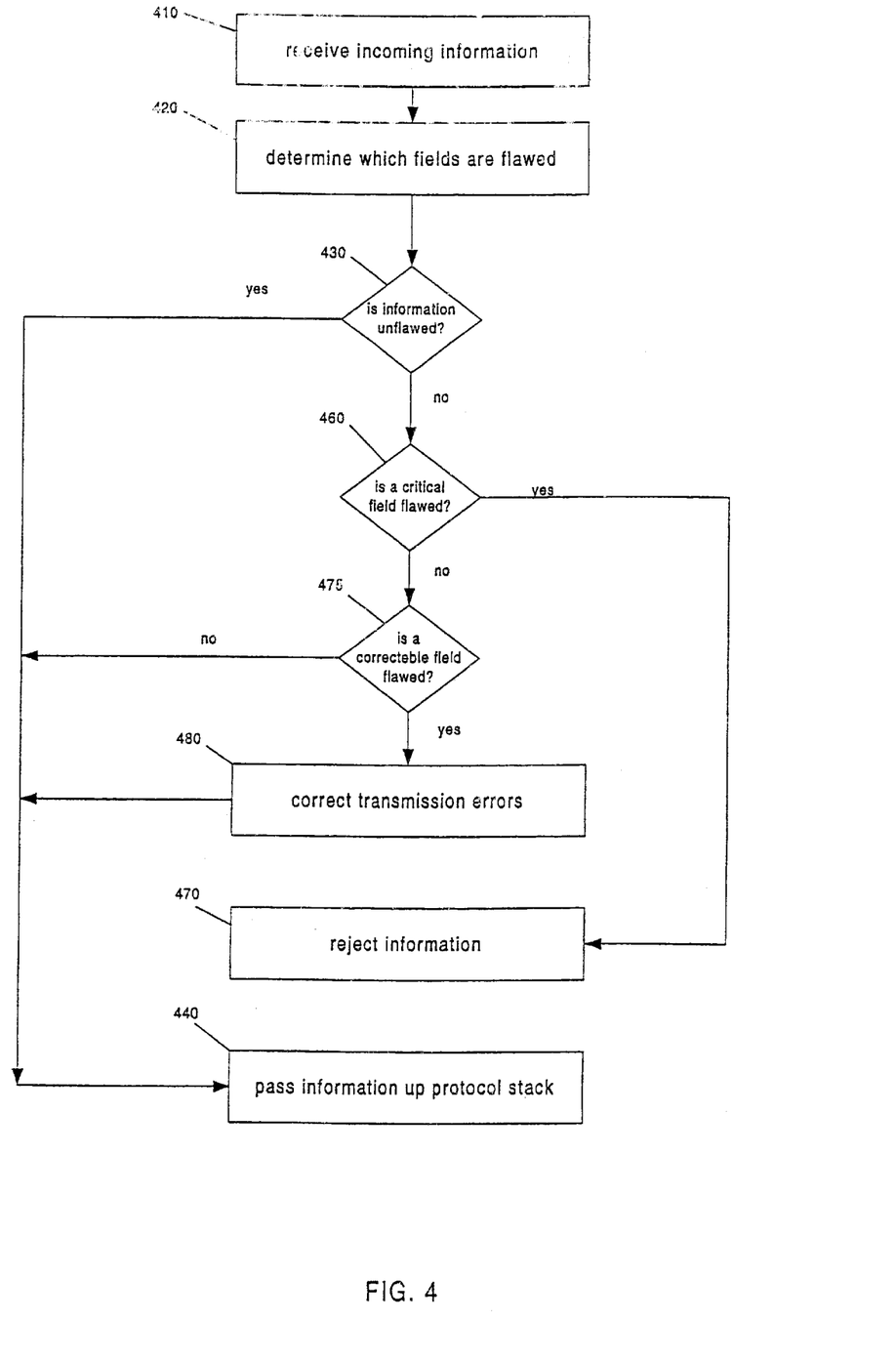
FIG. 4 is a flowchart showing the operation of the second processor of FIG. 1, in accordance with a preferred method of the present invention, upon receipt of incoming information.

More particularly, FIG. 4 describes the operation of the second processor 130b upon receipt of incoming information, for example upon receipt of an incoming packet 310. The incoming information is received in a block 410. It is determined which (if any) fields or portions of the information are flawed in a block 420, and the results of this determination are examined in a block 430. When the information is determined to be without flaw, which indicates the absence of transmission error, the information is passed up the second protocol stack 140b in a conventional manner in a block 440.

Otherwise (i.e., when the information is flawed), it is determined whether any critical fields are flawed in a block 460, by comparing the flawed fields to information retrieved from a list, catalog, or database regarding fields of critical importance that is held within or made available to the second processor 130b or its delegate. When at least one critical field is flawed, the information is rejected in a block 470. Rejected information would typically, but not necessarily, be re-sent by the information source 110 under the provisions of an automatic repeat request (ARQ) mechanism (not shown). When flaws are not found in critical fields, it is determined, again by reference to a list, whether any correctable fields are flawed in a block 475. When correctable fields are found to be flawed, transmission errors in those fields are corrected in a block 480, and the information is passed up the second protocol stack 140b in the block 440. Otherwise (i.e., flaws are present, but they are not in critical or correctable fields), the flawed fields must be tolerant, and the information is passed (uncorrected) up the second protocol stack 140b in the block 440. Alternately, when flaws are present but the flaws do not fall into critical or correctable fields, an attempt at correcting the transmission errors in the tolerant field may be made, and the result passed up the second protocol stack 140b.

Figure 5:
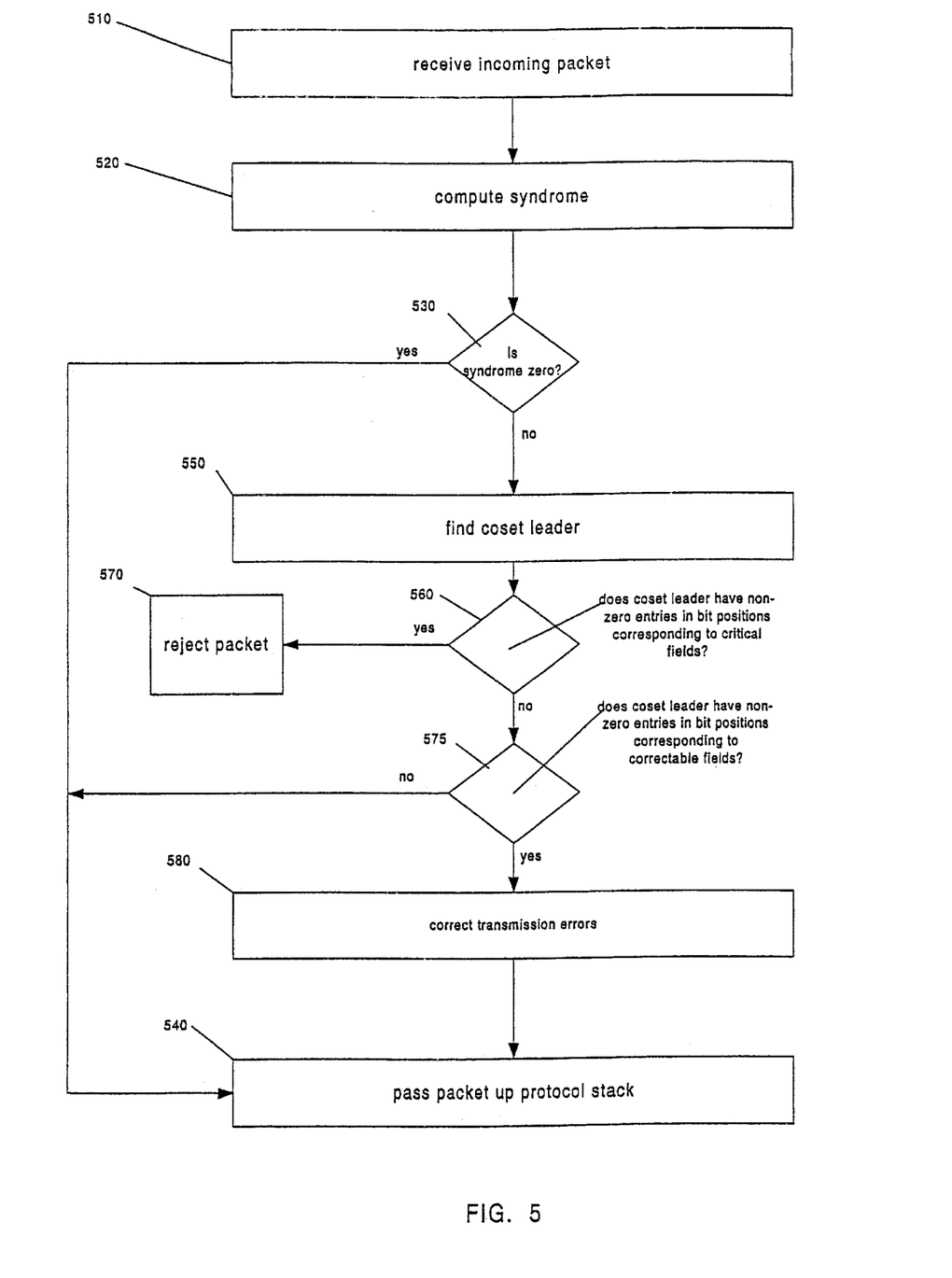
FIG. 5 is a refinement of FIG. 4 applicable to the use of a linear channel code, and shows the operation of the second processor of FIG. 1 upon receipt of an incoming packet.

FIG. 5 is a refinement of FIG. 4 that is applicable to a preferred embodiment of the invention that includes a binary linear channel code. FIG. 5, like FIG. 4, is couched in the operation of the second processor 130b upon receipt of an incoming packet 310. The incoming packet 310 is received in a block 510. The incoming packet is decoded by computing the syndrome in a block 520. The syndrome is examined in a block 530. When the syndrome is all-zero, which indicates the absence of transmission errors, the packet 310 is passed up the second protocol stack 140b in a conventional manner in a block 540. Otherwise (i.e., when the syndrome is not all-zero), decoding of the incoming packet continues in a block 550 by finding the coset leader associated with the syndrome.

The coset leader is examined in a block 560 to determine whether it has non-zero entries in bit positions that correspond to critical fields of the packet 310. The purpose of this step is to gauge whether any of the critical fields are flawed. When non-zero syndrome entries correspond to one or more critical fields of the packet 310, the packet 310 is rejected in a block 570. Otherwise (i.e., when non-zero syndrome entries do not correspond to any of the critical fields), the coset leader is examined in a block 575. to determine whether the coset leader has non-zero entries in bit positions that correspond to correctable fields of the packet 310. When the examination is true, which means that correctable fields are flawed, transmission errors of the correctable fields are corrected in a block 580, and the packet 310 is passed up the second protocol stack 140b in the block 540. Otherwise (i.e., flaws are present, but they are not in critical or correctable fields) the flawed fields must be tolerant, and the packet 310 is passed (uncorrected) up the second protocol stack in the block 540. Alternately, when flawed fields are tolerant, an attempt may be made to correct transmission errors in the tolerant fields, and the result passed up the second protocol stack 140b.

To further understand the operations mentioned above and shown in FIGS. 4 and 5, consider an (n,k) linear channel code over a finite algebraic field of some size q, where k is the length of the input word, and n>k is length of the codeword. (Note that the compound term "finite algebraic field" appearing here and the simple term "field" appearing throughout have different meanings in long established conventional use as well as in this document). The code is represented by a generator matrix G with k rows and n columns. Throughout, an i-tuple refers to a row vector of length I whose elements are from the finite algebraic field. An input word x is formatted as a k-tuple, and maps into a codeword y formatted as an n-tuple as follows:

$$y = x\,G$$

using the appropriate addition and multiplication operators over the finite algebraic field.

Associated with G is a parity check matrix H with m=n−k rows and n columns. The matrix H is full rank and satisfies the equation $$G\,H^T = [0] \qquad (1)$$

where the superscript (T) denotes the transpose operation, and [0] is a matrix of zeros with k rows and m columns. For any n-tuple z, the syndrome s is an m-tuple given by $$s = z\,H^T$$

It follows from equation (1) that s is all-zero if and only if z is a codeword generated by G. In other words, the syndrome provides a way to identify codewords, and therefore also to detect transmission errors.

For a general linear code, the most efficient decoder uses syndromes. Decoding proceeds as follows: First, all $q^n$ n-tuples are classified according to their syndromes. It turns out that there are $q^m$ classes, also called cosets, each containing $q^k$ n-tuples. For each coset, an n-tuple e with the smallest Hamming weight (the number of non-zero elements) is chosen as the coset leader. The set of codewords is, of course, the coset corresponding to the all-zero syndrome. Also, for a linear code, the all-zero n-tuple is a codeword, and it is the coset leader of the coset coinciding with the set of codewords.

The syndrome decoder stores the list of $q^m$ syndromes s and their corresponding coset leaders e. When a codeword y is transmitted over a noisy transmission channel and received as an n-tuple z, the syndrome decoder first computes the syndrome $$s = z\,H^T$$

Then it uses the corresponding coset leader e as the error pattern that was most likely injected by the transmission channel, and subtracts that pattern from z:

$$y' = z - e$$

The resulting y', which is a codeword, is the best guess the decoder can make about the true codeword y. From y', the decoder produces the corresponding input word x' as its best guess about the true input word x. Note that when the decoder uses a coset leader of Hamming weight i, it is effectively correcting i errors.

A preferred embodiment of the present invention limits the extent to which the decoder allows corrections to occur, in recognition of the correction limit of the channel code, beyond which limit attempts at correction may themselves be likely to introduce errors. In this preferred embodiment, the coset leaders and their corresponding syndromes are sorted according to the increasing Hamming weight of the coset leaders. That is, the all-zero coset leader is first, followed by the coset leaders of weight one, weight two, and so on. Based on the resulting ordering, the decoder is configured to correct errors up through a certain weight, and to detect but not correct errors of lesser weight.

To understand this in further detail, consider the scenario where the incoming digital information or input word x is made up of information portions having different importances or having other differences in characteristic. Without loss of generality, suppose for descriptive convenience that x is a concatenation of $x_1$ and $x_2$, $$x=[x_1 x_2]$$

where $x_1$ contains information that needs to be received with very high reliability (e.g., critical information, such as a packet header or particular field within a header) and $x_2$ contains information that could withstand a few errors without serious consequence (e.g., correctable information, such as a payload carrying elements of a digitized image).

For simplicity, we consider a generator matrix in systematic form, that is where the k columns on the left coincide with an identity matrix. This means that the first k symbols of the codeword y coincide with the input word x. We can express the codeword y as $$y=[x_1 x_2 p]$$

where p contains the parity symbols. Let $n_1$ denote the length of $x_1$, and $n_2=n-n_1$.

The decoder treats $x_1$ and $x_2$ differently, because $x_1$ and $x_2$ have different characteristics, and therefore need to be processed differently when flawed. Consider the coset leaders e and their corresponding syndromes s. Each coset leader e is partitioned into $e_1$ containing the $n_1$ leftmost elements of e, and $e_2$ containing the remaining $n_2$ elements. The result is called here a partitioned coset leader. We choose two thresholds $T_1$ and $T_2$ either or both of which may be sometimes set to zero. Here, $T_1$ is the largest number of errors we allow the decoder to correct over the $n_1$ leftmost elements of the received n-tuple z, which elements are in this example the header, and $T_2$ is the largest number of errors we allow the decoder to correct over the $n_2$ remaining elements, which elements are in this case the payload. This allows. us to classify the coset leaders e by comparing the weights of $e_1$ and $e_2$ to $T_1$ and $T_2$, respectively.

Figure 6:
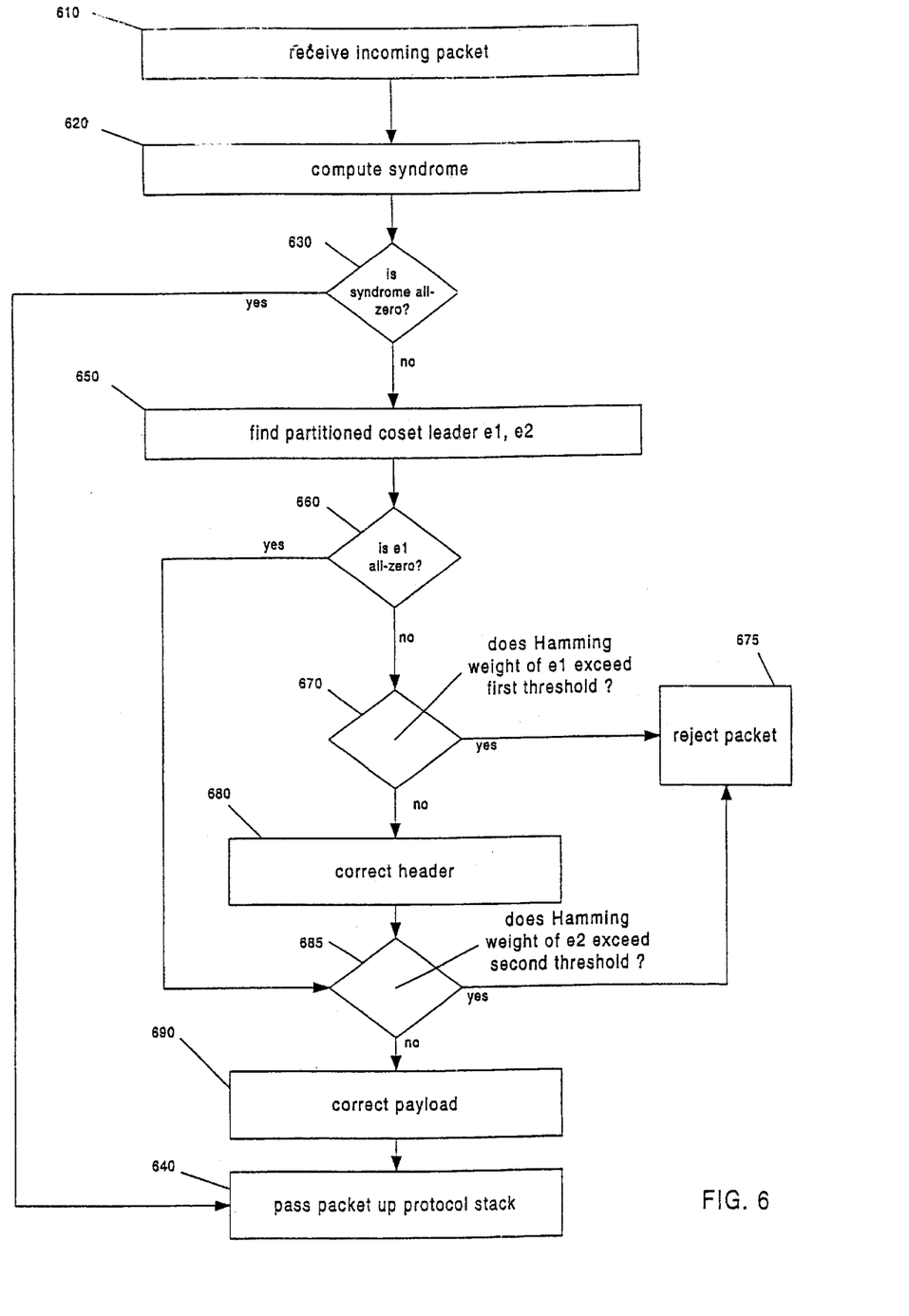
FIG. 6 is a flowchart showing the operation of the second processor of FIG. 1, in accordance with a preferred method of the present invention, upon receipt of incoming information for which a partitioned coset leader is found.

FIG. 6 is a flowchart that shows the logical operation of a preferred embodiment of the present invention according to the ideas presented above. An incoming packet 310 is received in a block 610. The syndrome of. the incoming packet 310 is computed in a block 620. The syndrome. is examined in a block 630 to see if it is all-zero. When the syndrome is all-zero, the packet is passed up the second protocol stack 140b in a conventional manner in a block 640. Otherwise (i.e., the syndrome is not all-zero), the partitioned coset leader is found in a block 650. The leftmost portion ($e_1$) of the partitioned coset leader is examined in a block 660. When $e_1$ is not all-zero, the Hamming weight of $e_1$ is compared with the first threshold $T_1$ in a block 670. When the Hamming weight of $e_1$ exceeds the threshold $T_1$, the packet is rejected in a block 675. Otherwise, transmission errors in the leftmost portion of the input word (the packet header, in this example), are corrected responsive to $e_1$ in a block 680. Upon correction of these errors in the block 680, as well as when $e_1$ was found to be all-zero in the block 660, the Hamming weight of $e_2$ is compared with the second threshold $T_2$ in a block 685. When the Hamming weight of $e_2$ exceeds the threshold $T_2$, the packet is rejected in the block 675. Otherwise, transmission errors in the rightmost portion of the input word (the packet payload, in this example), are corrected responsive to $e_2$ in a block 690, and the packet is passed up the second protocol stack 140b in the block 640.

To understand these ideas further, consider the simple binary Hamming code with n=7 and k=4. A systematic generator matrix G is given by $$G = \begin{bmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{bmatrix}$$

and it corresponding parity check matrix H is given by $$H = \begin{bmatrix} 1 & 1 & 0 & 1 & 1 & 0 & 0 \\ 1 & 0 & 1 & 1 & 0 & 1 & 0 \\ 0 & 1 & 1 & 1 & 0 & 0 & 1 \end{bmatrix}$$

The syndromes s and the corresponding coset leaders are given by

| s | | | e | | | | | | |
|---|---|---|---|---|---|---|---|---|---|
| 0 | 0 | 0 | 0 | 0 | 0 | 0 | 0 | 0 | 0 |
| 0 | 0 | 1 | 0 | 0 | 0 | 0 | 0 | 0 | 1 |
| 0 | 1 | 0 | 0 | 0 | 0 | 0 | 0 | 1 | 0 |
| 0 | 1 | 1 | 0 | 0 | 1 | 0 | 0 | 0 | 0 |
| 1 | 0 | 0 | 0 | 0 | 0 | 0 | 1 | 0 | 0 |
| 1 | 0 | 1 | 0 | 1 | 0 | 0 | 0 | 0 | 0 |
| 1 | 1 | 0 | 1 | 0 | 0 | 0 | 0 | 0 | 0 |
| 1 | 1 | 1 | 0 | 0 | 0 | 1 | 0 | 0 | 0 |

The table indicates that the exemplary Hamming code is able to correct all errors patterns of weight 0 or 1, and nothing else. Now suppose $n_1=2$, $T_1=0$ and $T_2=1$. The table indicates that s=(101) and s=(110) correspond to errors in e in either of the two leftmost symbols, that is in $e_1$. Given a received n-tuple z, we first compute s. If s=(101) or s=(110), the error correction limit on $e_1$ has been exceeded, and the packet or received n-tuple is rejected. Otherwise, the decoder corrects errors over $e_2$.

A variation of the method of FIG. 6 is described as follows: If exceeding the error correction limit on one part of the received n-tuple may lead to stopping the decoding process as in blocks 670 and 675 of FIG. 6, it is more efficient to compute just enough of the syndrome to make that decision. Specifically, we first partition the parity check matrix H corresponding to G into two parts, $H_1$ containing the $n_1$ leftmost columns of H, and $H_2$ containing the remaining $n_2$ columns. Given a received n-tuple z, it is convenient and efficient to compute a first partial syndrome $$s_1 = z_1 H_1^T$$

and a second partial syndrome $$s_2 = z_2 H_2^T$$

where $z_1$ contains the $n_1$ leftmost elements of the received n-tuple z, and $z_2$ containing the remaining $n_2$ elements. Linearity of the process ensures that $$s = s_1 + s_2$$

Because $z_1$ has fewer elements than z, computing $s_1$ is less complex than computing s. Consequently, the decoding process is modified to increase its computational efficiency as follows: First compute $s_1$. If the error correction limit has been exceeded, stop. If not, compute $s_2$, and finish the decoding procedure.

Figure 7:
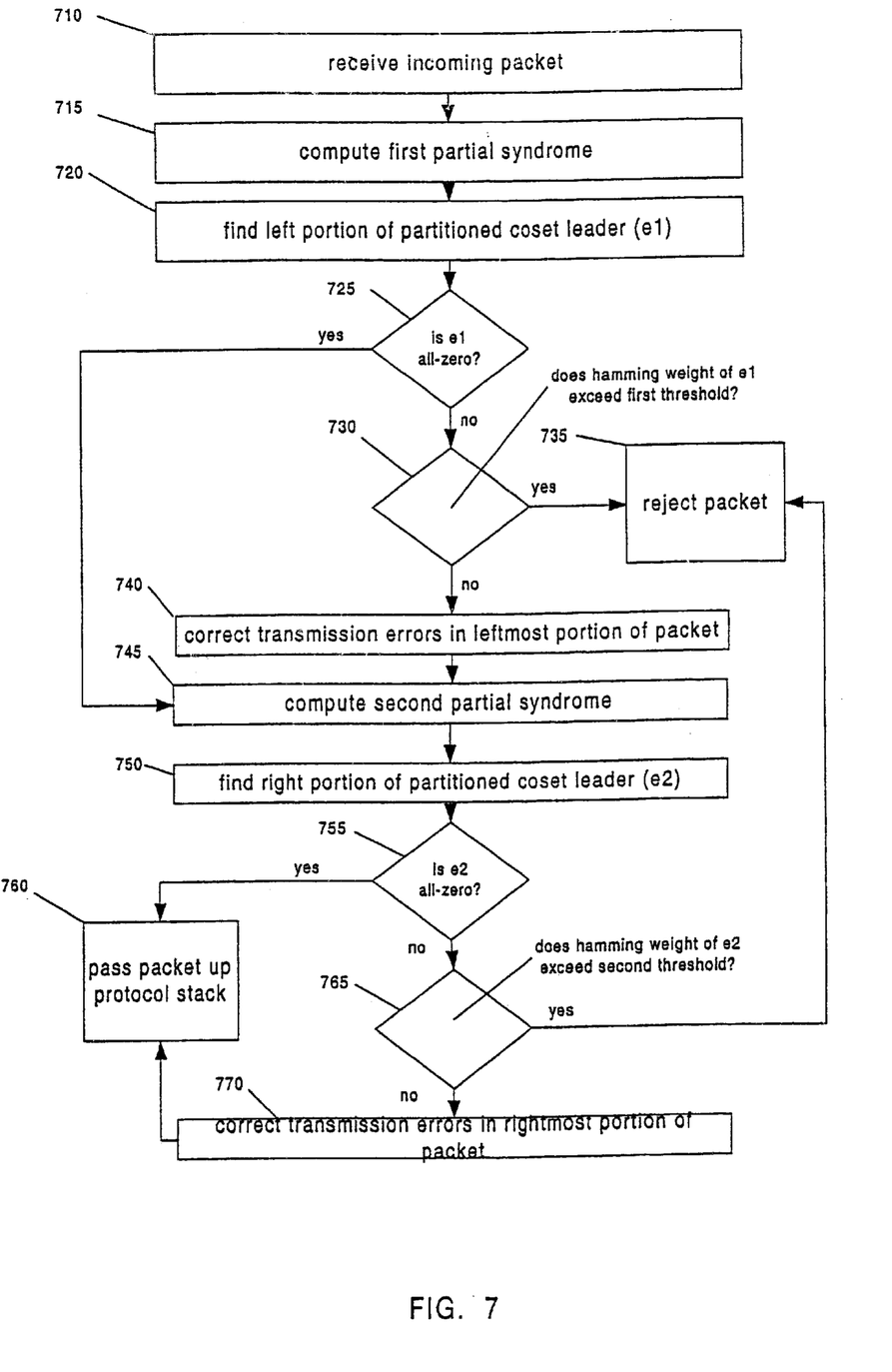
FIG. 7 shows a refinement of the preferred method shown in FIG. 6, where the refinement includes finding a partial syndrome.

More specifically, FIG. 7 is a flowchart that shows a preferred embodiment of the present invention according to these ideas. An incoming packet is received in a block 710. The first partial syndrome $s_1$ of the received packet is computed in a block 715, and the leftmost portion $e_1$ of the partitioned coset leader is found in a block 720. The portion $e_1$ is examined in a block 725 to see if it is all zero. When the syndrome is not all-zero, the Hamming weight of $e_1$ is compared with the first threshold $T_1$ in a block 730. When the Hamming weight of $e_1$ exceeds the threshold $T_1$, the packet 310 is rejected in a block 735.

Otherwise (i.e., the Hamming weight does not exceed the threshold), transmission errors in the leftmost portion of the input word (the packet header, in this example), are corrected in a block 740. Upon correction of these errors in the block 740, as well as when $e_1$ was found to be all-zero in the block 725, the second partial syndrome $s_2$ is computed in a block 745. The rightmost portion $e_2$ of the partitioned coset leader is found in a block 750, and the rightmost portion $e_2$ is examined in a block 755. When $e_2$ is all-zero, the packet 310 is passed up the second protocol stack 140b in a block 760. Otherwise (i.e., $e_2$ is not all-zero), the Hamming weight of $e_2$ is compared with the second threshold $T_2$ in a block 765.

When the Hamming weight of $e_2$ exceeds the threshold $T_2$, the packet is rejected in the block 735. Otherwise, transmission errors in the rightmost portion of the input word (the packet payload, in this example), are corrected in a block 770, and the packet 310 is passed up the second protocol stack 140b in the block 760.

The present invention has been described by example in specific terms so that it may be understood readily. The invention is not, however, limited to those exemplary terms and elements, and applies to a wide variety of digital communication systems. For example, while a Hamming code is discussed here for the purpose of clear description, the present invention is not limited to the use of a Hamming code; rather, the present invention encompasses the use of other redundancy and parity methods, including a wide spectrum linear error-correcting and error-detecting codes as described in the above-named references (Lin and Berlekamp) as well as in more recent publications, all of which are embraced herein by the term "channel code." Moreover, once taught the present invention, those skilled in the art will understand that the description of a communication system with regard to FIG. 1 is generic, and that the present invention applies to other kinds of communication systems as well, including communication systems organized to accommodate frames, continuous bit streams, and other information as well as packets; to other kinds of packet structures having other fields and data organizations; to other kinds of communication channels, including wireline as well as wireless channels that span wide areas, metropolitan areas, local areas, electronic assemblies and subassemblies, microchips and memories, for which the appropriate transmitter or modulator 160 and receiver or demodulator 170, which includes baseband devices as well as other kinds of these devices, would be employed; and to the full spectrum of applications and payload information. Furthermore, the invention may, of course, be carried out in specific ways other than those set forth herein without departing from the spirit and the essential characteristics of the present invention. Consequently, the present embodiments are to be construed in all aspects as illustrative and not restrictive. All changes coming within the meaning and equivalence range of the appended claims are intended to be embraced by these claims.

What is claimed is:

1. A method of responding to transmission errors in digital information that is protected by a channel code and that is segmented into a plurality of fields such as a header field, a payload field, and a parity field, wherein the method is characterized by the steps of:
   a) decoding the digital information as a unitary whole according to the channel code;
   b) identifying, responsive to said decoding, a flawed field of the plurality of fields;
   c) determining a characteristic of said flawed field; and
   d) processing the digital information according to said characteristic.

2. The method of claim 1, wherein the step a) further comprises the following step:
   f) finding a syndrome of the digital information.

3. The method of claim 2, wherein said syndrome is a partial syndrome.

4. The method of claim 2, further comprising the following step performed after step f):
   g) finding a coset leader that corresponds to said syndrome.

5. The method of claim 4, further comprising the following step performed after step g):
   h) comparing locations of non-zero bits of said coset leader with fields of the digital information.

6. The method of claim 2, further comprising the following step performed after step f):
   i) finding a portion of a partitioned coset leader.

7. The method of claim 6, further comprising the following step performed after step i):
   j) comparing locations of non-zero bits of said portion of a partitioned coset leader with fields of the digital information.

8. The method of claim 1, wherein said characteristic of said flawed field is an importance of said flawed field.

9. The method of claim 8, wherein step d) further comprises: the following step:
   k) rejecting the digital information when said importance of said flawed field is critical.

10. The method of claim 8, wherein step d) further comprises the following step:
    l) correcting a transmission error in said flawed field when said importance of said flawed field is correctable.

11. The method of claim 8, wherein step d) further comprises the following step:
    m) accepting the digital information without correction of a transmission error in said flawed field when said importance of said flawed field is tolerant.

12. The method of claim 8, wherein step d) further comprises the following step:
    n) correcting a number of transmission errors in said flawed field when said importance of said flawed field is tolerant.

13. The method of claim 12, wherein said number exceeds a correction limit of the channel code.

14. The method of claim 1, wherein said characteristic is position of said flawed field within the digital information.

15. The method of claim 1, wherein said characteristic is identity of an application of said flawed field.

16. The method of claim 1, wherein said characteristic is identity of a session owning said flawed field.

17. A method of responding to transmission errors in digital information that is protected by a channel code and that is segmented into a plurality of fields such as a header field, a payload field, and a parity field, wherein the method comprises the steps of:

a) receiving the digital information;
   b) computing a syndrome of the digital information as a unitary whole according to the channel code;
   c) finding a coset leader associated with said syndrome;
   d) finding a flawed field of the plurality of fields of the digital information by comparing said coset leader to the digital information;
   e) determining a characteristic of said flawed field; and
   f) processing the digital information according to said characteristic.

18. The method of claim 17, wherein said syndrome is a partial syndrome.

19. The method of claim 17, wherein said characteristic of said flawed field is an importance of said flawed field.

20. The method of claim 19, wherein step f) further comprises the following step:

g) rejecting the digital information when said importance of said flawed field is critical.

21. The method of claim 19, wherein step f) further comprises the following step:

h) correcting a transmission error in said flawed field when said importance of said flawed field is correctable.

22. The method of claim 19, wherein step f) further comprises the following step:

i) accepting the digital information without correction of a transmission error in said flawed field when said importance of said flawed field is tolerant.

23. The method of claim 19, wherein step f) further comprises the following step:

j) correcting a number of transmission errors in said flawed field when said importance of said flawed field is tolerant.

24. The method of claim 23, wherein said number of transmission errors exceeds a correction limit of the channel code.

25. The method of claim 19, wherein said characteristic is position of said flawed the digital information.

26. The method of claim 19, wherein said characteristic is identity of an of said flawed field.

27. The method of claim 19, wherein said characteristic is identity of a session flawed field.

* * * * *